United States Patent
Basham et al.

(10) Patent No.: US 6,425,059 B1
(45) Date of Patent: Jul. 23, 2002

(54) DATA STORAGE LIBRARY WITH LIBRARY-LOCAL REGULATION OF ACCESS TO SHARED READ/WRITE DRIVES AMONG MULTIPLE HOSTS

(75) Inventors: Robert Beverley Basham, Aloha; Leonard George Jesionowski; Stanley Bert Slawson, both of Tucson, all of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,415

(22) Filed: Dec. 11, 1999

(51) Int. Cl.[7] .............................................. G06F 12/00
(52) U.S. Cl. ...................... 711/153; 711/163; 711/173; 711/202
(58) Field of Search .................. 711/153, 163, 711/173, 202; 369/30.29, 30.35

(56) References Cited

U.S. PATENT DOCUMENTS

| | | |
|---|---|---|
| 5,121,483 A | 6/1992 | Monaham et al. ........... 395/275 |
| 5,386,516 A | 1/1995 | Monahan et al. ........... 395/275 |
| 5,416,914 A | 5/1995 | Korngiebel et al. ........ 395/425 |
| 5,546,557 A | 8/1996 | Allen et al. ................. 395/438 |
| 5,761,503 A | 6/1998 | Fisher ........................ 395/427 |
| 5,870,732 A | 2/1999 | Fisher et al. .................... 707/1 |
| 5,875,481 A * | 2/1999 | Ashton et al. .............. 707/206 |
| 6,044,442 A * | 3/2000 | Jesionowski ................ 711/100 |
| 6,182,167 B1 * | 1/2001 | Basham et al. ................ 710/38 |
| 6,185,165 B1 * | 2/2001 | Jesionowski et al. .... 369/30.34 |
| 6,328,766 B1 * | 12/2001 | Long .............................. 718/8 |

OTHER PUBLICATIONS

Fouts et al., "Brevix design 1.01," Hewlet Packard Technical Document HPL–OSR–93–22, pp. 1–80, Apr. 1993.*

* cited by examiner

*Primary Examiner*—Matthew Kim
*Assistant Examiner*—Stephen Elmore
(74) *Attorney, Agent, or Firm*—Don Hubert & Assoc.

(57) ABSTRACT

A data storage library utilizes library-local features to regulate access to shared read/write drives among multiple hosts, and thereby avoid the need for arbitrating host software. The library includes multiple data storage media, multiple data storage media slots, multiple read/write drives, and a library controller. The slots are originally partitioned into multiple logical libraries. Normally, the library shares the read/write drives among all hosts. However, when a host submits a request to unload a cartridge from a read/write drive, the library only honors that request if the host has access rights to the logical library from where the cartridge was originally loaded. Similarly, for each slot, the controller prevents a requesting host from loading a cartridge from that storage slot unless the requesting host has access rights to the logical library that includes that storage slot.

22 Claims, 3 Drawing Sheets

DATA STORAGE LIBRARY WITH LIBRARY-LOCAL REGULATION OF ACCESS TO SHARED READ/WRITE DRIVES AMONG MULTIPLE HOSTS

BACKGROUND OF THE INVENTION

1. Field of the Invention

The present invention relates to data storage libraries housing multiple tapes or other data storage cartridges. More particularly, the invention concerns a data storage library that utilizes library-local features to regulate access to shared read/write drives among multiple hosts, thereby avoiding arbitrating host software.

2. Description of the Related Art

A small computer system interface ("SCSI") medium changer is a data storage device including storage slots, drives, and input/output (I/O) slots. SCSI medium changers also include robotic mechanisms that move data cartridges among other SCSI medium changer components. One example of a SCSI medium changer device is an IBM model 3575 tape library.

In many applications, it is desirable to share some or all components of a SCSI medium changer among multiple host applications. Sharing is especially desirable for tape libraries, since they are often used for the limited purpose of backing up data, and otherwise lie dormant during long periods when the tape library could be working for other hosts. Thus, especially for large tape libraries, it is desirable to have several host applications take turns using the library and its tape drives.

One problem with achieving this level of sharing is the need to arbitrate access among the different hosts. Namely, the sharing host applications must have some mechanism to ensure that one host does not access, or worse yet, update the contents of another host's cartridges. One popular solution is to install intervening software between the library and its hosts to arbitrate access to the library cartridges and tape drives. This software is known as "middleware," and numerous examples are commercially available. Nonetheless, there are certain drawbacks. For instance, additional expense is required to purchase and maintain the middleware programs. Installation of the middleware requires the user to sacrifice processing capability of existing host hardware, or invest in additional processing hardware to run the middleware.

In contrast with middleware, a different approach is to logically partition storage slots and tape drives into distinct logical SCSI medium changer devices. This approach is implemented in the IBM model 3575 tape library, for example. The partitioning approach establishes "logical" partitions, each including an assortment of slots and one or more tape drives. Each partition is exclusively associated with one host. Thus, this approach shares the library resources by exclusively associating specific library resources to particular hosts.

Although this approach has certain advantages, engineers at International Business Machines Corp. ("IBM") are continually seeking to improve the performance and efficiency of such systems. In this respect, one area of continual focus concerns the possibility of greater efficiency and device utilization through more efficient sharing schemes. In this respect, the present inventors have recognized that the partition approach still does not sufficiently share the read/write drives, one of the most expensive components in a tape library. Namely, one drive may be extremely busy processing requests of its corresponding host application, while other drives are inactive. Nonetheless, the other drives cannot be recruited to satisfy the busy host's requests due to the lines of partition.

Consequently, from the standpoint of efficiency, known library sharing schemes may not be completely adequate for some applications due to certain unsolved problems.

SUMMARY OF THE INVENTION

Broadly, the present invention concerns a data storage library that utilizes library-local features to regulate access to shared read/write drives among multiple hosts, thereby avoiding arbitrating host software. The library includes multiple data storage media, multiple data storage media slots, multiple read/write drives, and a library controller. The storage slots are originally partitioned into multiple "logical libraries," with one or more hosts having access rights to the slots of each logical library. The controller will prevent a requesting host from removing a cartridge from a source storage slot unless the requesting host has access rights to the logical library of the source storage slot. In contrast to the partitioned storage slots, empty read/write drives are normally shared among all hosts. However, the controller will prevent a requesting host from unloading a cartridge from a read/write drive unless the requesting host has access rights to the "originating" logical library containing the storage slot from where the cartridge was loaded into the drive.

Accordingly, one embodiment of this invention concerns a method to regulate access to shared read/write drives among multiple hosts, thereby avoiding arbitrating host software. In another embodiment, the invention may be implemented to provide an apparatus, such as a data storage library, including structure to regulate access to shared read/write drives among multiple hosts, and thus avoid arbitrating host software. In still another embodiment, the invention may be implemented to provide a signal-bearing medium tangibly embodying a program of machine-readable instructions executable by a digital data processing apparatus to perform operations as described herein. Another embodiment concerns logic circuitry having multiple interconnected electrically conductive elements configured to perform such operations.

The invention affords its users with a number of distinct advantages. Importantly, the present invention efficiently utilizes expensive library hardware resources by sharing empty read/write drives among multiple hosts. Accordingly, the present invention treats read/write drives as serially reusable resources, rather than exclusively assigning each drive to one or more hosts. Since this sharing scheme is implemented by the library controller, the invention advantageously utilizes library-local components to arbitrate host access to shared read/write drives. Thus, the invention avoids the need for expensive middleware programs to arbitrate host access to shared read/write drives. Similarly, the invention avoids sacrificing processing capability of existing host hardware that would be caused by running host-based arbitrating software. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Introduction

Figure 1:
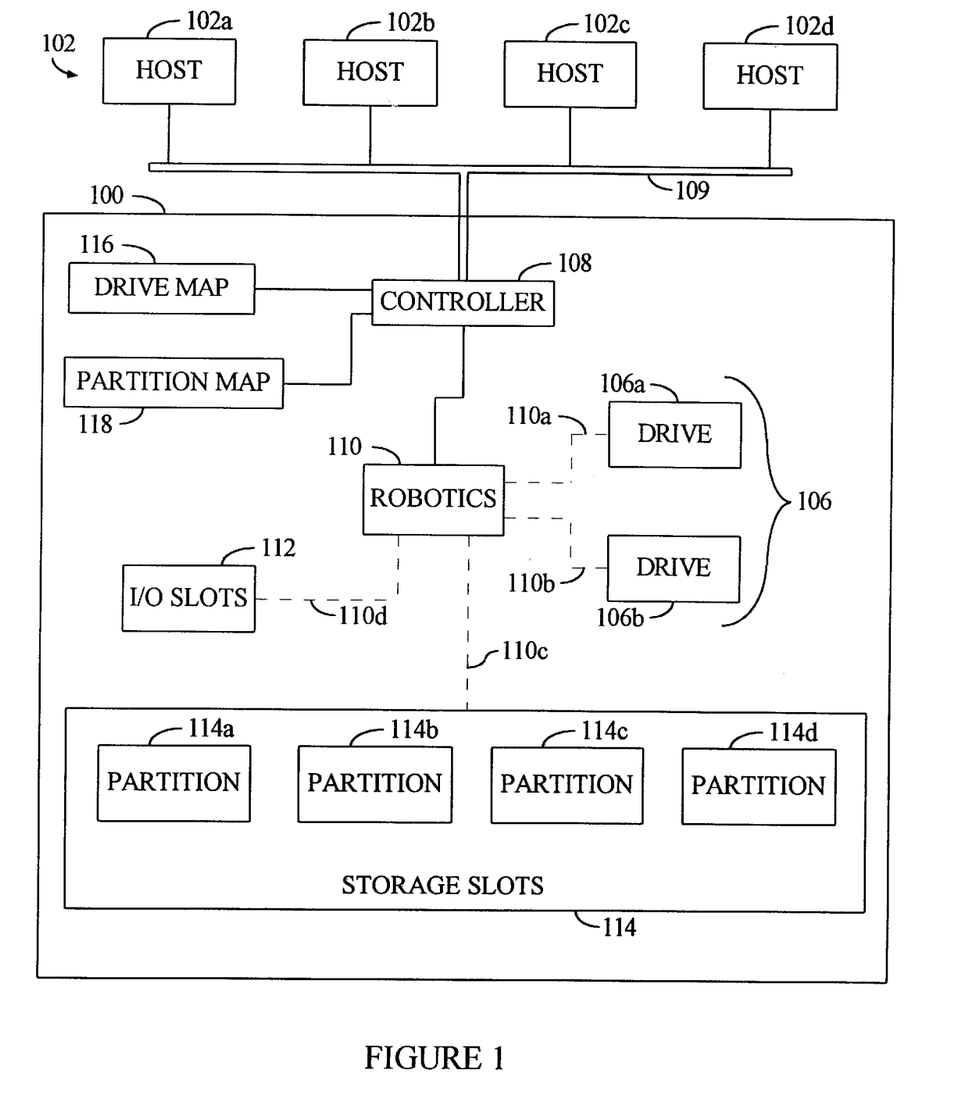
FIG. 1 is a block diagram of the hardware components and interconnections of a data storage system according to the invention.

One aspect of the invention concerns a data storage system, which may be embodied by various hardware components and interconnections as described in FIG. 1. FIG. 1 shows a data storage library 100 coupled to a number of hierarchically superior hosts 102. The library 100 includes many portable data storage media, such as magnetic tape cartridges, optical cartridges, writeable CDs, etc. For ease of reference, the portable data storage media of the library 100 are referred to as "cartridges."

Host(s)

Among other possible functions, the hosts 102 supply data to the library 100 for storage, and send requests to the library 100 to retrieve data. Multiple hosts 102 are shown, since one beneficial feature of the data storage library 100 its sharing of read/write drives among multiple hosts. As illustrated, the hosts 102 include hosts 102a–102d.

The host role may be satisfied by various types of hardware, such as a digital data processing computer, logic circuit, construction of discrete circuit components, interface to a human operator, etc. As an example, one or more hosts 102 may comprise IBM RS/6000 machines employing an operating system such as AIX. The hosts 102 may also be coupled to respective interfaces (not shown), enabling the hosts 102 to exchange information with a human operator. Each such interface may comprise a control panel, video monitor, computer keyboard/mouse, or another appropriate human/machine interface.

The hosts 102 manage data in the library 100 using "location-centric" commands, and may utilize the SCSI medium changer protocol as one example. With location-centric commands, the hosts 102 request cartridge movement by specifying source and destination locations in the library 100. Using the SCSI medium changer protocol to further illustrate one example, the hosts 102 may specify locations such as locations of medium transport elements, storage elements, import/export elements, data transfer elements, and the like.

Library

The library 100 is coupled to the hosts 102 by an interface 109, which may be embodied in various forms. Some examples include wires/cables, one or more busses, fiber optic lines, wireless transmission, intelligent communications channel, etc. The library 100 carries out host requests to move cartridges, access cartridges, etc.

In one embodiment, the library 100 comprises a SCSI removable media library, such as a tape library. Along with other alternatives, the library 100 may utilize other connectivity options, such as a fibre channel-to-SCSI bridge product, SCSI-to-SCSI multiplexer, etc.

Drive

The library 100 includes multiple drives 106 to conduct read/write operations with cartridges in the library 100. In the present example, two drives 106a–106b are shown. Advantageously, the controller 108 oversees sharing of the drives 106 among the hosts 102, avoiding the need for any additional, library-external hardware or "middleware" software package. Since the drives 106 are shared without preference for one or another, the drives 106a–106b may be called a "drive pool".

Each drive 106 comprises suitable hardware to access the format of data storage cartridge in the library 100. For example, in the case of magnetic tape cartridges, the drive 106 may comprise IBM model 3590 tape drives. Cartridges are directed to/from the drives 106 by robotics 110, described below.

Cartridge Storage & Management

The library 100 includes equipment to physically move and store the cartridges. For instance, storage slots 114 house dormant cartridges. The storage slots 114 comprise shelves or other data storage library compartments. I/O slots 112 are provided to transfer cartridges to/from the library 100 without disrupting the operation of the robotics 110 or drives 106. Using the I/O slots 112, an operator can introduce cartridges into the library 100 ("insert" operation), or the library 100 can expel cartridges ("eject" operation). For example, the I/O slots 112 may comprise "pass-through" slots, a carriage, conveyor, etc.

The storage slots 114 are logically divided into multiple "partitions," also called "logical libraries." In the present example, four partitions 114a–114d are illustrated. The partitions 114a–114d may be selected to achieve any desired relationship with the physical storage slots. For example, a partition may include one slot, a row of slots, a panel of slots, a selection of individual slots, or any other arrangement.

According to the present invention, the partitions are used to implement one technique for sharing the storage slots 114 among the multiple hosts 102. As explained below, the library controller 108 acts as a gateway that prevents a host from accessing the slots of each partition 114a–114d unless that host has "access rights" to that partition. Access rights occur according to a user selected host-partition mapping that is established at system configuration, or another appropriate time. As an example, the host-partition mapping may specify that the host 102a has exclusive access to the partition 114a, the host 102b has access to the partition 114b, and so on. Under host-partition mapping, one or more hosts have access rights to each partition.

To move cartridges between the drives 106, I/O slots 112, and storage slots 114, the library 100 includes robotics 110. The robotics 110 access these components by respective paths 110a, 110b, 110c, and 110d. The robotics 110 may be implemented by any suitable cartridge movement machinery, such as robotic arms, integrated cartridge loading equipment, conveyors, grippers movable on an x-y coordinate system, etc. The robotics 110 may include a single device that is shared among the hosts 102, or multiple devices that are partitioned or shared, depending upon the needs of the application. Likewise, the I/O slots 112 may be partitioned or shared, depending upon the requirements of the application.

Controller

The library 100 operates under supervision of the controller 108, which receives commands from the hosts 102 requesting the controller 108 to move cartridges between storage slots 114, I/O slots 112, and the drives 106. The controller 108 communicates with the hosts 102 via the interface 109. In addition to the interface 109, which constitutes a "control" path, the library 100 also includes a "data" path (not shown) that carries data between the hosts 102 and the read/write drives 106.

The controller 108 comprises a digital data processing machine, logic circuit, construction of discrete circuit components, or other automated mechanism, and operates according to suitable programming, physical configuration, etc. To provide a specific example, the controller 108 may comprise an IBM POWER-PC processor.

The hosts 102 send location-centric movement requests for controller 108 to move cartridges. Each movement request includes a movement command along with various parameters, such as source and destination addresses corresponding to desired locations among the storage slots 114, I/O slots 112, and drives 106. The controller 108 maintains a drive map 116 and partition map 118. The drive map 116 maintains information that is used by the controller 108 in arbitrating use of the drives 106 among the hosts 102, as explained below. TABLE 1 shows an example of the drive map 116. Each row represents one drive, and lists the following related information:

1. The identity of the drive 106a–106b represented by this row.
2. Whether the drive contains a cartridge ("full") or not ("empty").
3. If the drive contains a cartridge, the identity of the "originating" partition 114a–114d where the cartridge came from.

TABLE 1

DRIVE MAP

| DRIVE | FULL/EMPTY | ORIGINATING PARTITION |
|---|---|---|
| DRIVE 106a | FULL | PARTITION 114d |
| DRIVE 106b | EMPTY | N/A |

The partition map 118 contains the host-partition mapping to aid the controller 108 in properly limiting each host's access to the host's designated partition. Each partition is only accessible by hosts with access rights to that partition. TABLE 2 shows an example of the partition map 118. Each row represents one storage slot 114, and lists the following related information:

1. The storage slot's physical address.
2. The identity of the partition containing this slot.
3. The identities of all hosts with access rights to the partition containing this slot.

TABLE 2

PARTITION MAP

| PHYSICAL ADDRESS OF STORAGE SLOT | PARTITION | HOST(S) WITH ACCESS RIGHTS |
|---|---|---|
| 000001 | 114a | 102a |
| 000002 | 114a | 102a |
| 000003 | 114a | 102a |
| 000004 | 114a | 102a |
| ... | ... | ... |
| 000234 | 114b | 102b, 102c |
| 000235 | 114b | 102b, 102c |
| 000236 | 114b | 102b, 102c |
| ... | ... | ... |
| 000301 | 114c | 102c, 102d |
| 000302 | 114c | 102c, 102d |
| ... | ... | ... |
| 001024 | 114d | 102d |

TABLE 2-continued

PARTITION MAP

| PHYSICAL ADDRESS OF STORAGE SLOT | PARTITION | HOST(S) WITH ACCESS RIGHTS |
|---|---|---|
| 001025 | 114d | 102d |
| 001026 | 114d | 102d |
| 001027 | 114d | 102d |
| 001028 | 114d | 102d |
| 001029 | 114d | 102d |
| ... | ... | ... |
| 002056 | 114d | 102d |

Exemplary Digital Data Processing Apparatus

The controller 108 may be implemented in various forms, including a digital data processing apparatus as one example. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Figure 2:
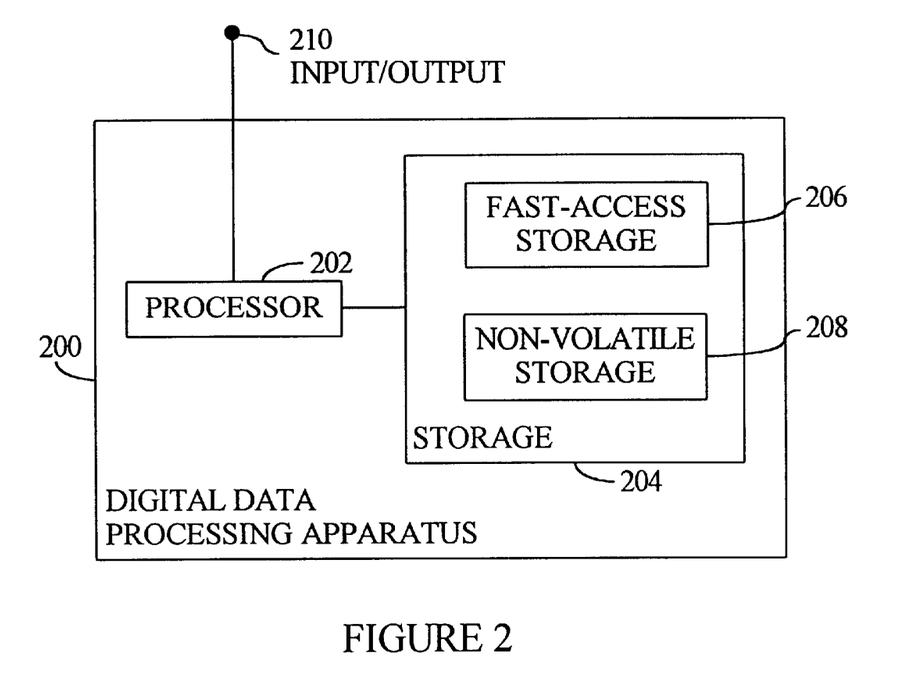
FIG. 2 is a block diagram of a digital data processing machine according to the invention.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions to implement the controller 108. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

In addition to the various hardware embodiments described above, a different aspect of the invention concerns a method for performing library-local arbitration of host access commands in a partitioned data storage library.

Signal-Bearing Media

In the context of FIGS. 1–2, such a method may be implemented, for example, by operating the controller 108, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method for performing library-local arbitration of host access commands in a partitioned data storage library.

Figure 3:
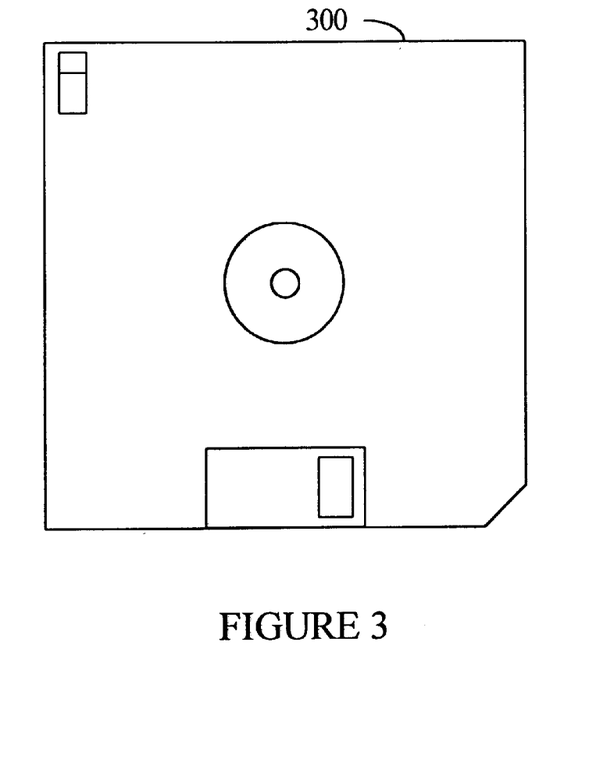
FIG. 3 shows an exemplary signal-bearing medium according to the invention.

This signal-bearing media may comprise, for example, RAM (not shown) contained within the controller 108, as represented by the fast-access storage 206. Alternatively, the instructions may be contained in another signal-bearing media, such as a magnetic data storage diskette 300 (FIG. 3), directly or indirectly accessible by the processor 200. Whether contained in the storage 206, diskette 300, or elsewhere, the instructions may be stored on a variety of machine-readable data storage media, such as direct access storage (e.g., a conventional "hard drive," redundant array of inexpensive disks ("RAID"), or another DASD), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the controller 108, and is configured to perform operations to implement the method of the invention. The logic circuitry may be implemented using many different types of circuitry, as discussed above.

Operating Sequence

Figure 4:
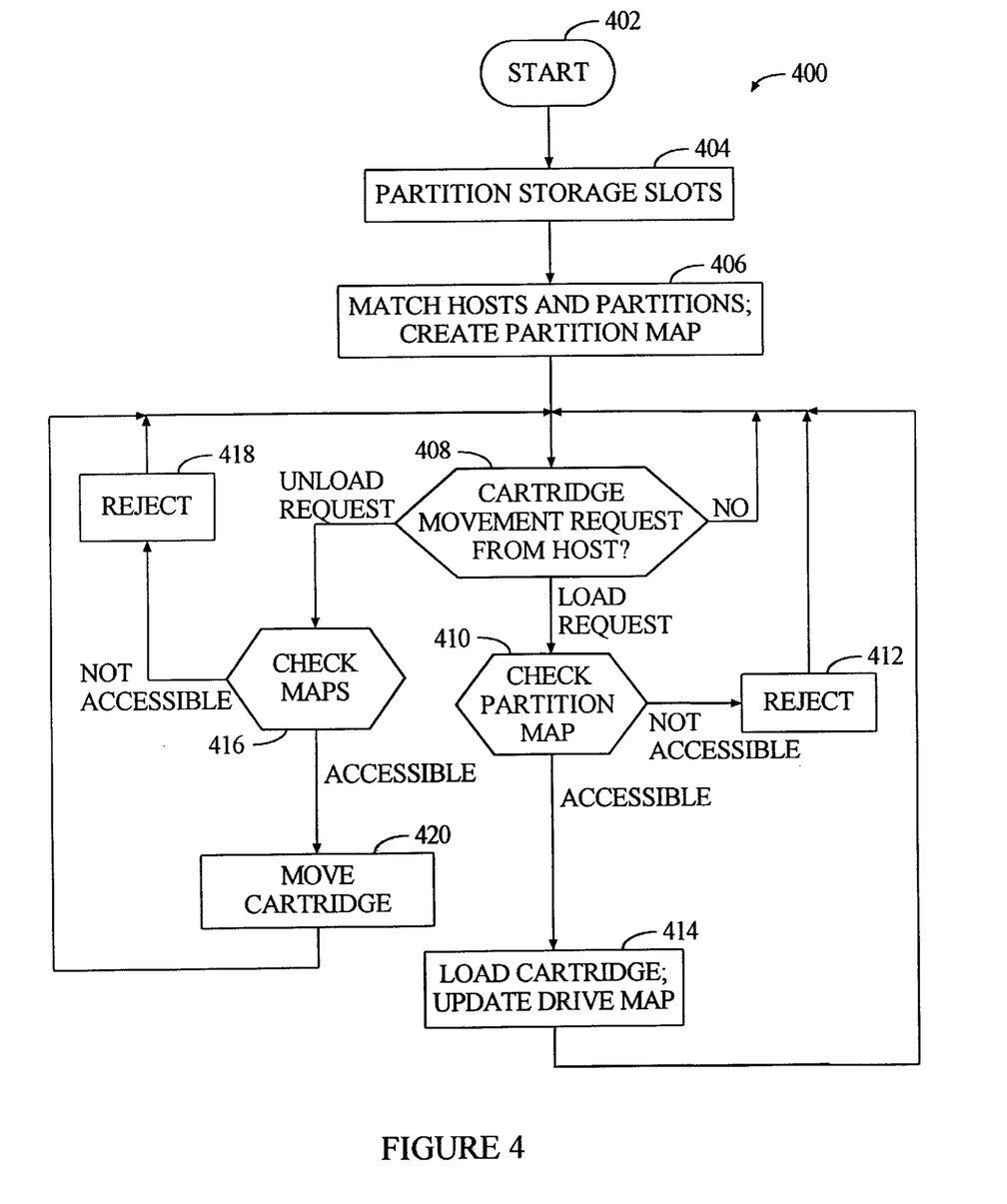
FIG. 4 is a flowchart of an operational sequence for library-local arbitration of host access commands according to the invention.

FIG. 4 shows one example of a sequence 400 to performing library-local arbitration of host access commands in a partitioned data storage library. For ease of explanation, but without any intended limitation, the example of FIG. 4 is described in the context of the hardware components and interconnections shown in FIG. 1, described above.

The steps 400 are initiated in step 402. After step 402, the library 100 is configured in step 404, 406. As an example, these steps may be performed when the library 100 is initially installed, subsequently reconfigured, or otherwise setup. In step 404, the storage slots 114 are logically allocated into partitions (also called "logical libraries"). As an example, step 404 may be achieved by an operator transmitting input data to the controller 108 via a keyboard or library control panel (not shown). This input data specifies the extent of each partition, and as an example, may identify:

1. The number of partitions.
2. The storage slots 114 contained in each partition.
3. Any "unshared" I/O slots 112, and the partition containing each unshared I/O slot.
4. Any unshared drives 106, and the partition containing each unshared drive. For clarity of explanation, the present illustration does not depict any unshared drives, to focus on the drive sharing aspect of the invention.

After step 404, step 406 conducts host-partition matching. This may be performed, for example, by the operator transmitting further input data to the controller 108. This input data associates one or more hosts with each partition; each host associated with a partition is said to have "access rights" to the facilities of that partition. If desired, a host may have access rights to than one partition; this may be avoided, however, by redefining these multiple partitions as a single partition. Also in step 406, the controller 108 stores the host-partition mapping in the partition map 118.

When step 406 is complete, the initial configuration of the library is finished. Next, the controller 108 determines whether it has received any host cartridge movement requests (step 408). If not, step 408 repeats. When the controller 108 receives a cartridge movement request from one of the hosts 102, the routine 400 branches according to whether the host requested an "unload" operation or a "load" operation. An unload operation involves transferring a cartridge from a drive to an I/O slot 112 or storage slot 114, whereas a load operation involves the opposite action.

If the controller 108 received a cartridge load request, step 408 advances to step 410. In step 410, the controller 108 examines the load request, which includes a load command and various load parameters, including (1) identification of a "source" storage or I/O slot containing the desired cartridge, and (2) optionally, specification of a "destination" read/write drive for the load operation. The controller 108 proceeds to access the partition map 118 to determine whether the host has access rights to the partition containing the identified source storage slot (if a destination drive has been specified and this drive is allocated to a partition). If not, then this host does not have permission to access the source slot and/or destination drive according to the host-partition mapping that was established in step 406. In this event, the controller 108 denies the host request in step 412 by returning an error message to the host, not responding, etc. Step 412 then leads back to step 408, to wait for the next host movement request.

In contrast, if the host has permission to access the cartridge in the source slot (and destination drive, if specified), then step 410 proceeds to step 414. In step 414, the controller 108 directs the robotics 110 to load the cartridge from the specified storage slot into the identified destination drive (if one was specified), or alternatively into any available drive if none was specified. Since the drives 106a–106b are shared among all hosts 102, the controller 108 may select any available drive if none was specified. If a specified destination drive is unavailable, of if all drives are unavailable and none were specified, the controller 108 may transfer the desired cartridge into a preloading shelf or loader, enter the cartridge's name in a load-pending memory queue for subsequent physical loading, etc. Assuming drive availability, in step 414 controller 108 also updates the drive map 116, which was described above in TABLE 2. Namely, step 414 updates the drive map to show the following data, cross-referenced against the chosen drive: (1) the partition where the loaded cartridge came from, and (2) the "full" status of the drive. After step 414, the load operation is complete, and control returns to step 408 to await the next cartridge movement request.

In contrast to the foregoing sequence, if the controller 108 received a cartridge unload request in step 408, then the routine 400 advances to step 416 instead of step 410. In step 416, the controller 108 examines the unload request, which includes an unload command and various parameters including (1) identification of the source drive 106 containing the cartridge to be unloaded, and (2) identification of a destination storage slot or 110 slot. Also in step 416, the controller 108 accesses the drive map 116 and partition map 1128 as follows. Namely, the drive map 116 indicates the originating partition, where the cartridge in the drive came from; the partition map 118 identifies the host(s) with access rights to the source partition. If the requesting host has access rights to the originating partition according to the partition map 118, then the controller 108 moves the cartridge from the drive to the destination slow pursuant to the host's request (step 420). Otherwise, if the requesting host does not have access rights to the originating partition, then the controller 108 denies the host request in step 418 by returning an error message to the host, not responding at all, etc. In an alternative embodiment, the requesting host is required to have access rights to both the originating partition and destination location. In this embodiment, if the requesting host has access rights to the originating partition and destination location according to the partition map 118, then the controller 108 moves the cartridge from the drive to the destination slot pursuant to host's request (step 420). Otherwise, if the requesting host does not have access rights to both partitions (i.e., originating and destination slot), then the controller 108 denies the host request in step 418 by returning an error message to the host, not responding at all, etc. After steps 418 or 420, the controller returns to step 408 to wait for the next host movement command.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for managing access to a physical data storage library among multiple hosts coupled thereto, the data storage library including a controller, multiple shared read/write drives, multiple slots to house data storage cartridges, and robotics to transfer cartridges between the drives and slots, the method comprising operations of:
   partitioning the data storage library into multiple logical libraries, each logical library including multiple constituent slots;
   establishing host-partition mapping providing one or more hosts with access rights to each logical library;
   responsive to receiving each host request to load a cartridge from a specified source slot, the controller performing operations comprising:
     identifying a source logical library containing the source slot, and determining whether the host has access rights to the source logical library; and
     only if the host has access rights to the source logical library, directing the robotics to load the cartridge from the source slot into one of the shared read/write drives;
   responsive to receiving each host request to unload a cartridge from a specified one of the read/write drives into a target slot, the controller performing operations comprising:
     identifying an originating logical library from which the cartridge was loaded into the specified read/write drive;
     only if the host has access rights to the originating logical library, directing the robotics to remove the cartridge from the shared read/write drive and transfer the cartridge into the target slot.

2. The method of claim 1, where:
   if the received host request to load a cartridge identifies a destination drive, the operation of directing the robotics to load the cartridge comprises directing the robotics to load the cartridge into the identified destination drive;
   otherwise, if the received host request to load a cartridge does not identify one of the drives, the operation of directing the robotics to load the cartridge further comprises choosing one of the shared drives and directing the robotics to load the cartridge into the chosen drive.

3. The method of claim 1, where:
   the operations further comprise, responsive to each host request to unload a cartridge, identifying a logical library containing the target slot;
   the operation of directing the robotics to remove the cartridge is only performed if the host has access rights to the originating logical library and the host has access rights to the logical library containing the target slot.

4. The method of claim 1, where:
   the partitioning and establishing operations include storing one or more partition maps showing relationships between each logical library and its constituent slots, and between the logical libraries and the hosts with access rights thereto; and
   the operations of identifying a source logical library containing the source slot and determining whether the host has access rights to that logical library are performed by referencing the partition maps.

5. A method of operating a data storage library that includes multiple data storage media, multiple media slots, and multiple read/write drives, comprising operations of:
   partitioning the media slots into multiple logical libraries;
   for each slot, preventing a requesting host from removing a cartridge from said media slot unless the requesting host has access rights to a logical library that includes that slot;
   providing shared access to one or more of the read/write drives among all hosts; and
   preventing a requesting host from unloading a cartridge from a shared read/write drive unless the requesting host has access rights to a logical library that includes a slot from where the cartridge was loaded into the shared read/write drive.

6. A signal-bearing medium tangibly embodying a program of machine-readable instructions executable by a digital processing apparatus to perform a method for managing access to a physical data storage library among multiple hosts coupled thereto, the data storage library including a controller, multiple shared read/write drives, multiple slots to house data storage cartridges, and robotics to transfer cartridges between the drives and slots, the method comprising operations of:
   partitioning the data storage library into multiple logical libraries, each logical library including multiple constituent slots;
   establishing host-partition mapping providing one or more hosts with access rights to each logical library;
   responsive to receiving each host request to load a cartridge from a specified source slot, the controller performing operations comprising:
     identifying a source logical library containing the source slot, and determining whether the host has access rights to the source logical library; and
     only if the host has access rights to the source logical library, directing the robotics to load the cartridge from the source slot into one of the shared read/write drives;

responsive to receiving each host request to unload a cartridge from a specified one of the read/write drives into a target slot, the controller performing operations comprising:
  identifying an originating logical library from which the cartridge was loaded into the specified read/write drive;
  only if the host has access rights to the originating logical library, directing the robotics to remove the cartridge from the shared read/write drive and transfer the cartridge into the target slot.

7. The medium of claim 6, where:
if the received host request to load a cartridge identifies a destination drive, the operation of directing the robotics to load the cartridge comprises directing the robotics to load the cartridge into the identified destination drive;
otherwise, if the received host request to load a cartridge does not identify one of the drives, the operation of directing the robotics to load the cartridge further comprises choosing one of the shared drives and directing the robotics to load the cartridge into the chosen drive.

8. The medium of claim 6, where:
the operations further comprise, responsive to each host request to unload a cartridge, identifying a logical library containing the target slot;
the operation of directing the robotics to remove the cartridge is only performed if the host has access rights to the originating logical library and the host has access rights to the logical library containing the target slot.

9. The medium of claim 6, where:
the partitioning and establishing operations include storing one or more partition maps showing relationships between each logical library and its constituent slots, and between the logical libraries and the hosts with access rights thereto; and
the operations of identifying a source logical library containing the source slot and determining whether the host has access rights to that logical library are performed by referencing the partition maps.

10. A signal-bearing medium tangibly embodying a program of machine-readable instructions executable by a digital processing apparatus to perform a method for operating a data storage library that includes multiple data storage media, multiple media slots, and multiple read/write drives, the method comprising operations of:
  partitioning the slots into multiple logical libraries;
  for each slot, preventing a requesting host from removing a cartridge from said slot unless the requesting host has access rights to a logical library that includes that slot;
  providing shared access to one or more of the read/write drives among all hosts; and
  preventing a requesting host from unloading a cartridge from a shared read/write drive unless the requesting host has access rights to a logical library that includes a slot from where the cartridge was loaded into the shared read/write drive.

11. A logic circuit of multiple interconnected electrically conductive elements configured to perform operations to manage access to a physical data storage library among multiple hosts coupled thereto, the data storage library including a controller, multiple shared read/write drives, multiple slots to house data storage cartridges, and robotics to transfer cartridges between the drives and slots, the method comprising operations of:
  partitioning the data storage library into multiple logical libraries, each logical library including multiple constituent slots;
  establishing host-partition mapping providing one or more hosts with access rights to each logical library;
  responsive to receiving each host request to load a cartridge from a specified source slot, the controller performing operations comprising:
    identifying a source logical library containing the source slot, and determining whether the host has access rights to the source logical library; and
    only if the host has access rights to the source logical library, directing the robotics to load the cartridge from the source slot into one of the shared read/write drives;
  responsive to receiving each host request to unload a cartridge from a specified one of the read/write drives into a target slot, the controller performing operations comprising:
    identifying an originating logical library from which the cartridge was loaded into the specified read/write drive;
    only if the host has access rights to the originating logical library, directing the robotics to remove the cartridge from the shared read/write drive and transfer the cartridge into the target slot.

12. A logic circuit of multiple interconnected electrically conductive elements configured to perform a method to operate a data storage library that includes multiple data storage media, multiple data storage media slots, and multiple read/write drives, the method comprising operations of:
  partitioning the slots into multiple logical libraries;
  for each slot, preventing a requesting host from removing a cartridge from said slot unless the requesting host has access rights to a logical library that includes that slot;
  providing shared access to one or more of the read/write drives among all hosts; and
  preventing a requesting host from unloading a cartridge from a shared read/write drive unless the requesting host has access rights to a logical library that includes a slot from where the cartridge was loaded into the shared read/write drive.

13. A data storage library accessible by multiple hosts, comprising:
  multiple shared read/write drives;
  multiple slots to house data storage cartridges;
  robotics to transfer cartridges between the drives and slots;
  where the data storage library is partitioned into multiple logical libraries, each logical library including multiple constituent slots, and where each logical library is only accessible by one or more hosts having access rights thereto;
  a controller, coupled to the robotics, programmed to manage access to the library among the hosts by:
    responsive to receiving each host request to load a cartridge from a specified source slot, the controller performing operations comprising:
      identifying a source logical library containing the source slot, and determining whether the host has access rights to the source logical library; and
      only if the host has access rights to the source logical library, directing the robotics to load the cartridge from the source slot into one of the shared read/write drives;

responsive to receiving each host request to unload a cartridge from a specified one of the read/write drives into a target slot, the controller performing operations comprising:
- identifying an originating logical library from which the cartridge was loaded into the specified read/write drive;
- only if the host has access rights to the originating logical library, directing the robotics to remove the cartridge from the shared read/write drive and transfer the cartridge into the target slot.

14. The library of claim 13, where the controller is further programmed such that:
- if the received host request to load a cartridge identifies a destination drive, the operation of directing the robotics to load the cartridge comprises directing the robotics to load the cartridge into the identified destination drive;
- otherwise, if the received host request to load a cartridge does not identify one of the drives, the operation of directing the robotics to load the cartridge further comprises choosing one of the shared drives and directing the robotics to load the cartridge into the chosen drive.

15. The library of claim 13, where the controller is further programmed such that:
- the operations further comprise, responsive to each host request to unload a cartridge, identifying a logical library containing the target slot;
- the operation of directing the robotics to remove the cartridge is only performed if the host has access rights to the originating logical library and the host has access rights to the logical library containing the target slot.

16. The library of claim 13, where the library further includes a drive map that shows, for each cartridge loaded into one of the drives, the logical library from where that cartridge was loaded into that drive.

17. The library of claim 13, where:
- the library includes one or more partition maps showing relationships between each logical library and its constituent slots, and between the logical libraries and the hosts with access rights thereto; and
- the operations of identifying a source logical library containing the source slot and determining whether the host has access rights to that logical library are performed by referencing the partition maps.

18. The library of claim 13, where one or more logical libraries includes one or more storage slots and one or more I/O slots.

19. The library of claim 13, where the data storage cartridges comprise serially accessible magnetic tape cartridges.

20. A data storage library accessible by multiple hosts, comprising:
- multiple data storage media;
- multiple media slots, partitioned into multiple logical libraries;
- multiple read/write drives; and
- cartridge movement robotics;
- a controller, coupled to the robotics, and programmed to direct the robotics to manage host access to the read/write drives according to operations comprising:
  - for each media slot, preventing a requesting host from removing a cartridge from said slot unless the requesting host has access rights to a logical library that includes that slot;
  - providing shared access to one or more of the read/write drives among all hosts; and
  - preventing a requesting host from unloading a cartridge from a shared read/write drive unless the requesting host has access rights to a logical library that includes a slot from where the cartridge was loaded into the shared read/write drive.

21. A data storage library accessible by multiple hosts, comprising:
- multiple shared read/write drives;
- multiple slot means for housing data storage cartridges;
- robotic means for transferring cartridges between the drives and slots;
- where the data storage library is partitioned into multiple logical libraries, each logical library including multiple slots, and where each logical library is exclusively accessible by a host if the host has access rights thereto;
- a controller means, coupled to the robotic means, for managing access to the library among the hosts by:
  - responsive to receiving each host request to load a cartridge from a specified source slot means, performing operations comprising:
    - identifying a source logical library containing the source slot means, and determining whether the host has access rights to the source logical library; and
    - only if the host has access rights to the source logical library, directing the robotic means to load the cartridge from the source slot means into one of the shared read/write drives;
  - responsive to receiving each host request to unload a cartridge from a specified one of the read/write drives into a target slot means, performing operations comprising:
    - identifying an originating logical library from which the cartridge was loaded into the specified read/write drive;
    - only if the host has access rights to the originating logical library, directing the robotics to remove the cartridge from the shared read/write drive and transfer the cartridge into the target slot means.

22. A data storage library accessible by multiple hosts, comprising:
- multiple data storage media;
- multiple media slots, partitioned into multiple logical libraries;
- multiple read/write drives; and
- movement means for moving cartridges;
- controller means, coupled to the robotics, for directing the movement means to manage host access to the read/write drives according to operations comprising:
  - for each media slot, preventing a requesting host from removing a cartridge from said slot unless the requesting host has access rights to a logical library that includes that slot;
  - providing shared access to one or more of the read/write drives among all hosts; and
  - preventing a requesting host from unloading a cartridge from a shared read/write drive unless the requesting host has access rights to a logical library that includes a slot from where the cartridge was loaded into the shared read/write drive.

* * * * *

UNITED STATES PATENT AND TRADEMARK OFFICE
CERTIFICATE OF CORRECTION

PATENT NO. : 6,425,059 B1
DATED : July 23, 2002
INVENTOR(S) : Robert Beverley Basham et al.

It is certified that error appears in the above-identified patent and that said Letters Patent is hereby corrected as shown below:

<u>Title page,</u>
Item [75], Inventors: insert -- , or -- after the word "Aloha".
Delete the name "Stanley" and replace with -- Staley --.
Delete "all of" after the word "Tucson."

Signed and Sealed this

Fourteenth Day of January, 2003

JAMES E. ROGAN
*Director of the United States Patent and Trademark Office*